(12) United States Patent
Arakawa et al.

(10) Patent No.: US 12,507,621 B2
(45) Date of Patent: Dec. 30, 2025

(54) GUIDE FOR REAR DISCHARGE OF LAWN MOWER

(71) Applicant: Honda Motor Co., Ltd., Tokyo (JP)

(72) Inventors: Takayuki Arakawa, Saitama (JP);
Norikazu Shimizu, Saitama (JP);
Hiroshi Hojo, Saitama (JP); Sotaro Furuta, Saitama (JP); Susumu Okubo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 863 days.

(21) Appl. No.: 17/702,796

(22) Filed: Mar. 24, 2022

(65) Prior Publication Data

US 2023/0301232 A1    Sep. 28, 2023

(51) Int. Cl.
*A01D 34/66*    (2006.01)
*A01D 34/81*    (2006.01)

(52) U.S. Cl.
CPC .......... *A01D 34/667* (2013.01); *A01D 34/81* (2013.01)

(58) Field of Classification Search
CPC ...... A01D 34/667; A01D 34/81; A01D 34/66; A01D 37/73
USPC ..................... 56/320.2, 13.3, 17.4
See application file for complete search history.

(56) References Cited

U.S. PATENT DOCUMENTS

| | | | |
|---|---|---|---|
| 6,038,840 A * | 3/2000 | Ishimori | A01D 34/66 56/13.3 |
| 6,609,358 B1 | 8/2003 | Schmidt et al. | |
| 7,735,306 B2 * | 6/2010 | Kure | A01D 34/71 56/6 |
| 9,125,341 B2 * | 9/2015 | Ebihara | A01D 34/667 |
| 9,629,307 B2 * | 4/2017 | Gaeddert | A01D 34/71 |
| 9,756,782 B2 * | 9/2017 | Andre | A01D 34/69 |

FOREIGN PATENT DOCUMENTS

| | | | | |
|---|---|---|---|---|
| FR | 2316858 A | * | 3/1977 | .......... A01D 34/667 |
| JP | 2007089498 | | 4/2007 | |
| JP | 2015084710 | | 5/2015 | |
| WO | WO-2020167825 A1 | * | 8/2020 | ............. A01D 34/73 |

OTHER PUBLICATIONS

"Office Action of Germany Counterpart Application", issued on Apr. 8, 2025, with English translation thereof, p. 1-p. 11.

* cited by examiner

*Primary Examiner* — Joseph M Rocca
*Assistant Examiner* — Sunny D Webb
(74) *Attorney, Agent, or Firm* — JCIPRNET (57) ABSTRACT

A guide plate for guiding grass that has been cut by a lawn mower having adjacent blades that are rotating in different directions is provided. The lawn mower includes a first blade having a first tip, and a second blade having a second tip, wherein the first blade and the second blade are disposed adjacent to each other, and a rotation direction of the first blade is different from a rotation direction of the second blade, wherein, in a lateral direction of the lawn mower, a guide plate is disposed between a rotation center of the first blade and a rotation center of the second blade, and the guide plate is disposed above the second blade, and the guide plate extends toward a rear of the lawn mower.

20 Claims, 8 Drawing Sheets

GUIDE FOR REAR DISCHARGE OF LAWN MOWER

BACKGROUND OF THE DISCLOSURE

Technical Field

The disclosure relates to a lawn mower, and more specifically relates to a guide for rear discharge of the lawn mower.

Related Art

Patent Literature 1 provides a lawn mower having blades adjacent to each other. The blades rotate in a same direction. Guide plates 35, 38 are disposed above the blades toward a rear side of the lawn mower.

A guide for guiding grass that has been cut by the lawn mower having adjacent blades that are rotating in different directions is needed.

SUMMARY

According to an embodiment of the disclosure, a lawn mower includes a first blade having a first tip, and a second blade having a second tip, wherein the first blade and the second blade are disposed adjacent to each other, and a rotation direction of the first blade is different from a rotation direction of the second blade, wherein, in a lateral direction of the lawn mower, a guide plate is disposed between a rotation center of the first blade and a rotation center of the second blade, and the guide plate is disposed above the second blade, and the guide plate extends toward a rear of the lawn mower

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

DESCRIPTION OF THE EMBODIMENTS

Figure 1:
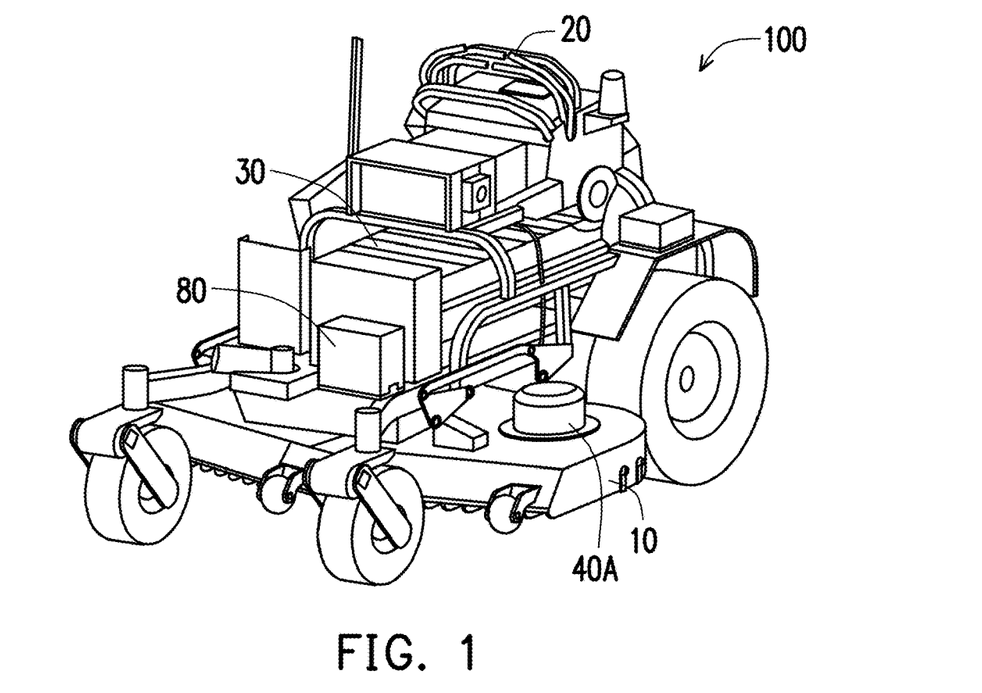
FIG. 1 is a schematic diagram illustrating a perspective view of a lawn mower according to an embodiment of the disclosure.
Figure 2:
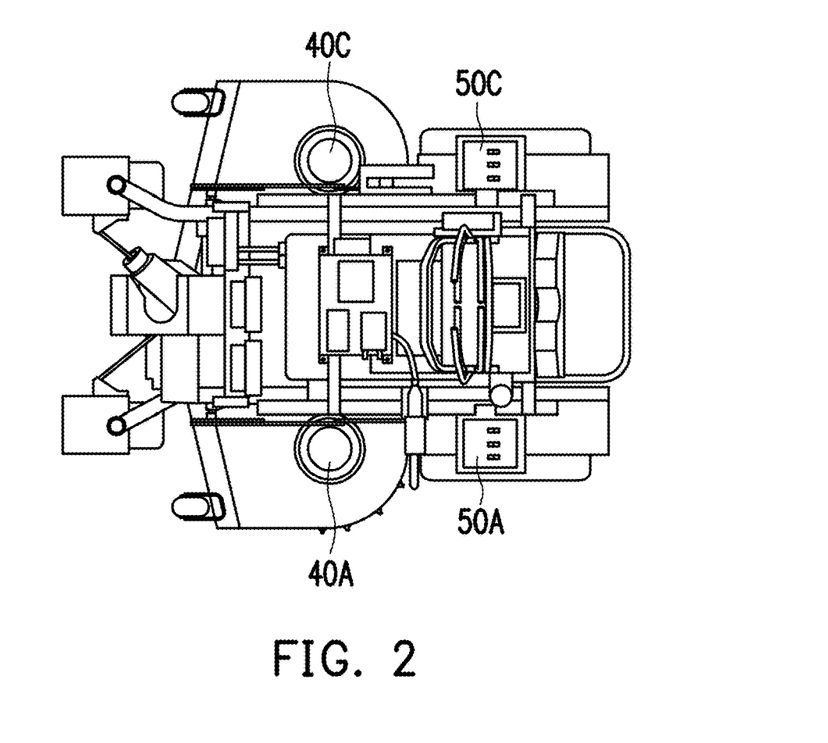
FIG. 2 is a schematic diagram illustrating a plan view of the lawn mower of FIG. 1.
Figure 3:
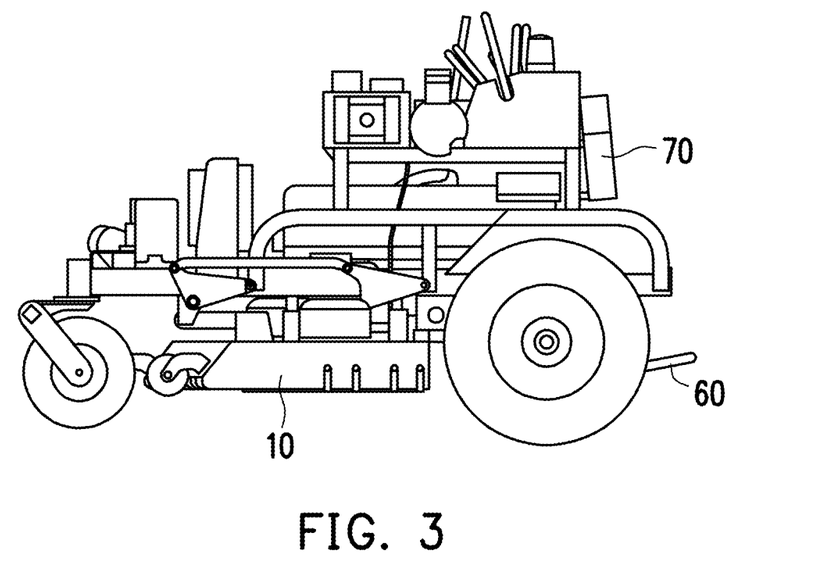
FIG. 3 is a schematic diagram illustrating a side view of the lawn mower of FIG. 1.

FIG. 1 is a schematic diagram illustrating a perspective view of a lawn mower according to an embodiment of the disclosure. FIG. 2 is a schematic diagram illustrating a plan view of the lawn mower of FIG. 1. FIG. 3 is a schematic diagram illustrating a side view of the lawn mower of FIG. 1. Referring to FIG. 1~FIG. 3, a lawn mower 100 is provided. In the present embodiment, the lawn mower 100 includes a grass cutting unit 10, an operation panel 20, a battery 30, a plurality of motors 40A, 40B, 40C, a plurality of motor drivers 50A, 50B, 50C. The lawn mower 100 further includes a standing platform 60 and a cushion 70. The plurality of motors 40A, 40B, 40C includes a first motor 40A, a second motor 40B and a third motor 40C. The plurality of motors 40A, 40B, 40C are disposed on the grass cutting unit 10. The second motor 40B is disposed between the first motor 40A and the third motor 40C.

The operation panel 20 may includes controls for an operator to control the lawn mower 100 such as the driving, steering, turning on the grass cutting unit 10 and the like. The plurality of motor drivers 50A, 50B, 50C drive the plurality of motors 40A, 40B, 40C respectively. The standing platform 60 is configured for the operator to stand on, and the operator may lean on or against the cushion 70 for comfort. In another embodiment of the disclosure, the lawn mower 100 may include a seat for the operator to sit on to operate the lawn mower 100. In another embodiment of the disclosure, the lawn mower 100 may be a robot operating without the operator onboard the lawn mower 100. The type of the lawn mower is not intended to limit the disclosure.

Figure 4:
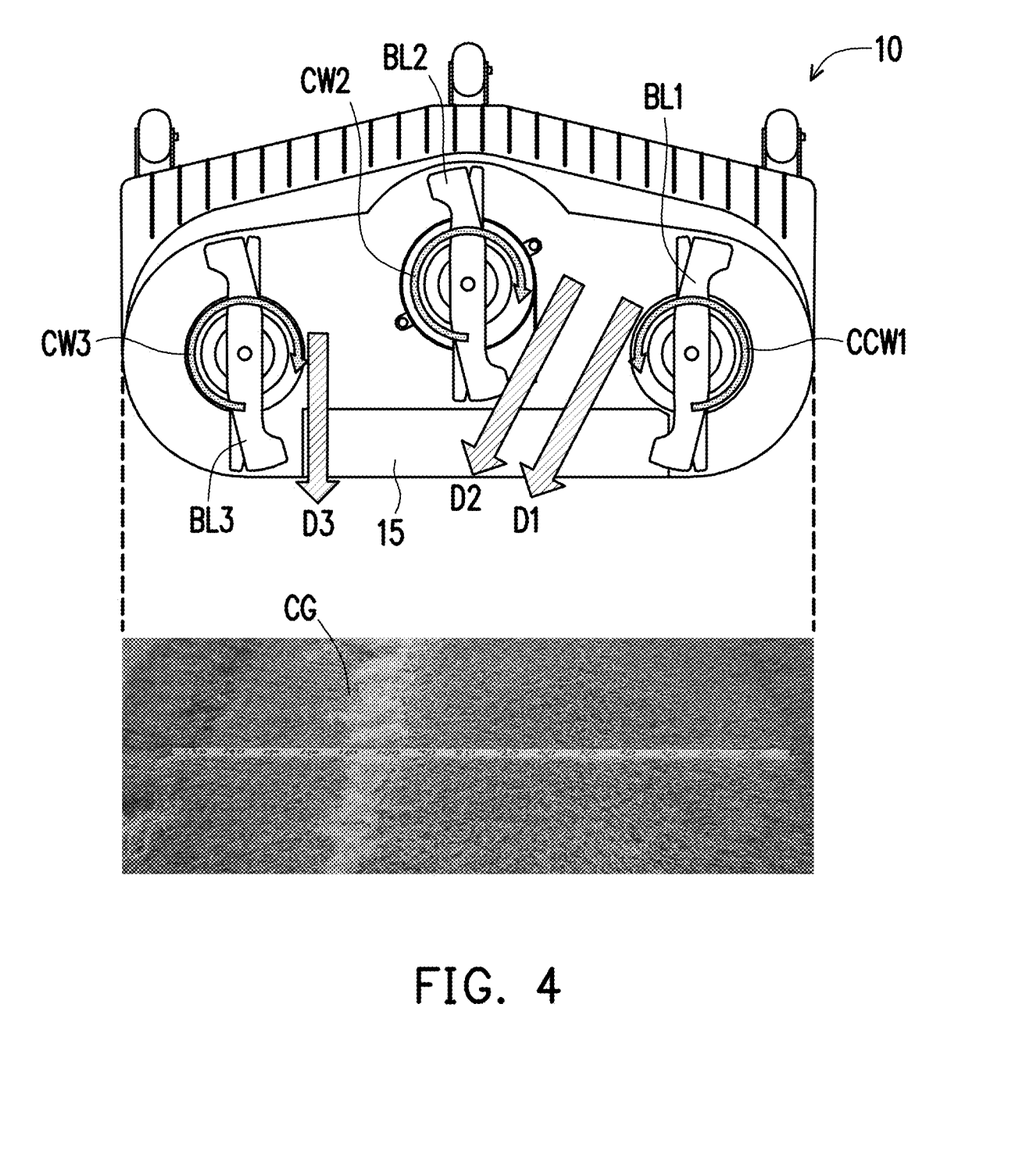
FIG. 4 is a schematic diagram illustrating a bottom view of a grass cutting unit of the lawn mower, and a rear discharge of cut grass from the lawn mower.

FIG. 4 is a schematic diagram illustrating a bottom view of a grass cutting unit of the lawn mower, and a rear discharge of cut grass from the lawn mower. Referring to FIG. 4, a first blade BL1 is connected to a first shaft SFT1 of the first motor 40A. A second blade BL2 is connected to a second shaft SFT2 of the second motor 40B. A third blade BL3 is connected to a third shaft SFT3 of the third motor 40C. The first blade BL1 and the second blade BL2 are disposed adjacent to each other.

Viewing the grass cutting unit 10 from the bottom view as shown in FIG. 4, the first blade BL1 is rotated by the first motor 40A in a counter clock wise direction CCW1 via the first shaft SFT1. The second blade BL2 is rotated by the second motor 40B in a clock wise direction CW2 via the second shaft SFT2. The third blade BL3 is rotated by the third motor 40C in a clock wise direction CW3 via the third shaft SFT3.

The rotation of the first blade BL1 in the counter clock wise direction CCW1 is a different rotation direction from a rotation direction of the second blade BL2 in the clock wise direction CW2. That is to say, a rotation direction of the first blade BL1 is different from a rotation direction of the second blade BL2. Furthermore, the rotation of the first blade BL1 in the counter clock wise direction CCW1 is a different rotation direction from a rotation direction of the third blade BL3 in the clock wise direction CW3. That is to say, a rotation direction of the first blade BL1 is different from a rotation direction of the third blade BL3.

In the present embodiment, the counter clock wise direction CCW1 is a direction substantially opposite to the clock wise direction CW2, and the counter clock wise direction CCW1 is a direction substantially opposite to the clock wise direction CW3. In the present embodiment, the clock wise direction CW2 is a direction substantially the same as the clock wise direction CW3.

Referring to FIG. 4, through the inventors research, it was found that in a lawn mower 100 wherein the first blade BL1 and the second blade BL2 are disposed adjacent to each other, and a rotation direction CCW1 of the first blade BL1 is different from a rotation direction CW2 of the second blade BL2, then the grass that is cut by the first blade BL1 may merge with the grass that is cut by the second blade BL2 to form a cluster. The cluster of cut grass that is discharged to the rear of the lawn mower 100 would appear as clumped grass clumped towards a particular side in a lateral direction of the lawn mower 100. The clumped grass was discharged towards the third blade BL3 in the lateral direction of the lawn mower 100. In the present embodiment, the lateral direction is a direction substantially perpendicular to a moving/traveling direction of the lawn mower 100.

Referring to FIG. 4, in more detail, the grass cut by the first blade BL1 is discharged towards a rear of the lawn mower 100 in a first direction D1. The grass cut by the second blade BL2 is discharged towards the rear of the lawn mower 100 in a second direction D2. The grass cut by the third blade BL3 is discharged towards the rear of the lawn mower 100 in a third direction D3. The first direction D1 is a direction substantially parallel to the second direction D2. The first direction D1 and the second direction D2 cross with the third direction D3. The first direction D1 and the second direction D2 includes a direction component in the lateral direction of the lawn mower 100 towards the third blade BL3. Since the cut grass CG discharged to the rear of the lawn mower 100 would clump towards the third blade BL3 side in the lateral direction of the lawn mower 100, the mowed lawn would appear uneven and/or disorganized (for example, see cut grass CG shown in FIG. 4).

Figure 5:
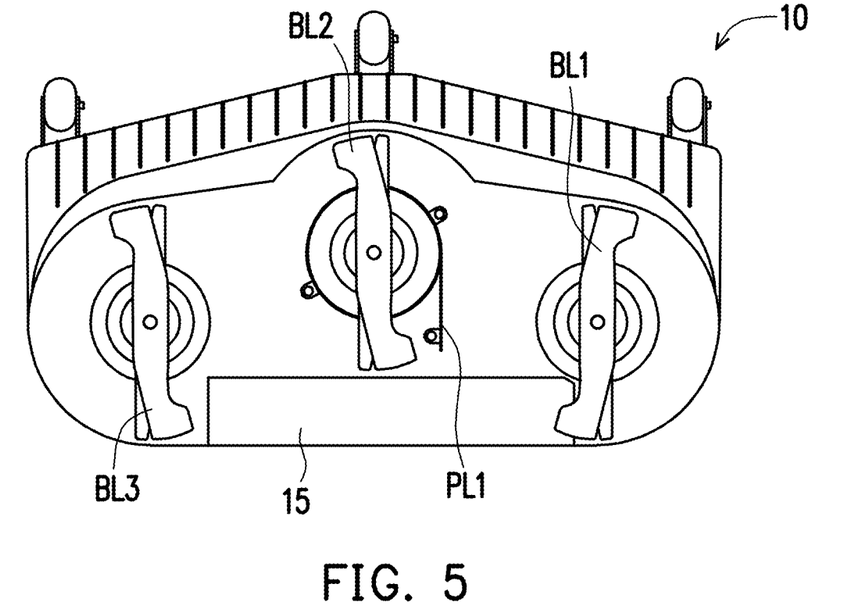
FIG. 5 is a schematic diagram illustrating a guide plate according to an embodiment of the disclosure.

FIG. 5 is a schematic diagram illustrating a guide plate according to an embodiment of the disclosure. Referring to FIG. 5, in the lateral direction of the lawn mower 100, a guide plate PL1 is disposed between a rotation center of the first blade BL1 and a rotation center of the second blade BL2. In the present embodiment, the guide plate PL1 has a rectangular shape, however the disclosure is not limited thereto. The guide plate PL1 may be directly or indirectly attached to a housing of the grass cutting unit 10. The guide plate PL1 may be fixed to the housing of the grass cutting unit 10, for example, by a fastener, adhesive, welding and/or the like. The guide plate PL1 has a plate shape, and the guide plate PL1 extends toward a rear of the lawn mower 100. A material of the guide plate PL1, for example, may be aluminium, plastic, metal and the like. However, the disclosure is not limited thereto, and the material of the guide plate PL1 may be set according requirements. The guide plate PL1 may prevent the merging of the grass cut by the first blade BL1 and the grass cut by the second blade BL2. In this way, the guide plate PL1 may help discharge the cut grass more evenly across the lateral direction of the lawn mower 100 such that clusters of the cut grass may be prevented.

Referring to FIG. 5, the front end of the guide plate PL1 is disposed closer to the rotation center of the second blade BL2 relative to the rotation center of the first blade BL1. That is to say, a distance from the front end of the guide plate PL1 to the rotation center of the second blade BL2 is smaller than a distance from the front end of the guide plate PL1 to the rotation center of the first blade BL1. In this way, the cut grass accumulating at the rear of the second blade BL2 may be prevented.

Figure 6:
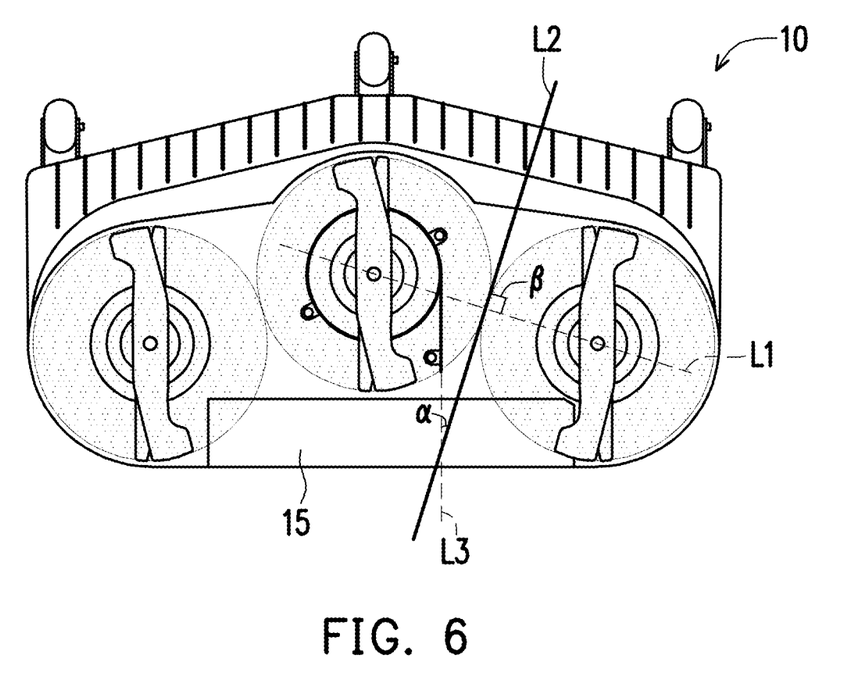
FIG. 6 is a schematic diagram illustrating a configuration of the guide plate with respect to adjacent blades rotating in different directions.

FIG. 6 is a schematic diagram illustrating a configuration of the guide plate with respect to adjacent blades rotating in different directions. Referring to FIG. 6, a first line L1 is represented by an imaginary line passing through the rotation center of the first blade BL1 and the rotation center of the second blade BL2. A front end of the guide plate PL1 is located forward of the first line L1 in a front-rear direction of the lawn mower. The front-rear direction is a direction perpendicular to the lateral direction of the lawn mower 100. That is to say, the front-rear direction is a direction substantially parallel to the moving/traveling direction of the lawn mower 100. The cut grass may be more properly guided by providing the guide plate PL1 at a location that is in front of the location where the grass cut by the first blade BL1 and the grass cut by the second blade BL2 merge.

Referring to FIG. 6, in more detail, the first blade BL1 is disposed at a location rear of the second blade BL2 in the front-rear direction of the lawn mower 100. That is to say, the rotation center of the first blade BL1 is disposed at a location rear of the rotation center of the second blade BL2 in the front-rear direction of the lawn mower 100. In other words, the rotation center of the second blade BL2 is disposed at a location forward of the rotation center of the first blade BL1 in the front-rear direction of the lawn mower 100. In this way, in the lateral direction of the lawn mower 100, the second blade BL2 overlaps with the first blade BL1 and the third blade BL3 to reduce the possibility of uncut grass.

Referring to FIG. 6, a second line L2 is represented by an imaginary line that is perpendicular to the first line L1. The second line L2 is located between a rotation perimeter of the first blade BL1 and a rotation perimeter of the second blade BL2. The rotation perimeter of the first blade BL1 and the rotation perimeter of the second blade BL2 are shown by dotted circles, respectively. The rotation perimeters are virtual rotation perimeters for explanation purposes. The second line L2 is commonly tangent to the rotation perimeter of the first blade BL1 and the rotation perimeter of the second blade BL2.

It should be noted, a small gap (space) may be formed between the rotation perimeter of the first blade BL1 and the rotation perimeter of the second blade BL2 such that the first blade BL1 and the second blade BL2 do not collide with each other.

Referring to FIG. 6, a third line L3 is represented by an imaginary line that is an extension of the guide plate PL1. More specifically, the third line L3 is an extension of the guide plate PL1 towards the rear of lawn mower 100. The third line L3 and the second line L2 cross each other at an acute angle α at a location rear of the first line L1 in the front-rear direction of the lawn mower 100. In other words, the third line L3 crosses the second line L2 to form the acute angle α at a location to the rear of the first line L1 in the front-rear direction. In this way, the cut grass accumulating at the rear direction of the first line L1 may be prevented such that the cut grass may be discharged more evenly.

Figure 7A:
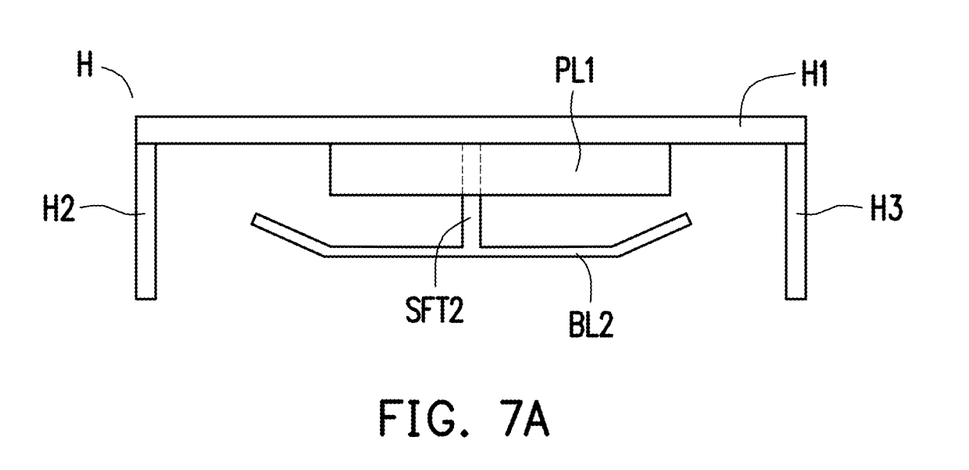
FIG. 7A is a schematic diagram illustrating a side view of the guide plate of FIG. 5.

FIG. 7A is a schematic diagram illustrating a side view of the guide plate of FIG. 7A. More specifically, the side view is a view of the guide plate when viewed in the lateral direction of the lawn mower 100. Referring to FIG. 7A, the second blade BL2 has tips located at an ends thereof. The tips of the second blade BL2 are portions of the second blade BL2 which cut grass during the rotation of the second blade B2. A portion of the second blade BL2 located away from the tips and towards a rotation center of the second blade BL2 do not cut grass as well as the tips of the second blade BL2. The tips of the second blade BL2 are inclined upward at an angle with respect to a body portion of the second blade BL2. The tips of the second blade BL2 generates a negative pressure during rotation, and the grass is lifted due to the negative pressure. The second blade BL2 may cut grass easier when the grass is lifted by the negative pressure generated by the inclined tip of the second blade BL2. The first blade BL1 and the third blade BL3 may similarly have inclined tips.

Referring to FIG. 7A, the guide plate PL1 is disposed above the second blade BL2 in a vertical direction of the lawn mower 100. The vertical direction is a direction perpendicular to the lateral direction and perpendicular to the front-rear direction. In more detail, a distance between the housing H(H1) of the grass cutting unit 10 and the guide plate PL1 is smaller than a distance between the housing H1 and the second blade BL2. That is to say, the guide plate PL1 protrudes from the housing of the grass cutting unit 10 while the second shaft SFT2 protrudes from the housing of the grass cutting unit 10 more than the guide plate PL1.

Referring to FIG. 7A, in addition to the housing H1, the grass cutting unit 10 may further include the housing H2 and the housing H3. The housing H2 extends away from the housing H1, and the housing H3 extends away from the housing H1. The grass to be cut may be pressed down by the housing H2 and the housing H3, however, the grass that is pressed down by the housing H2 and the housing H3 may be lifted up (to stand up) by the airflow generated by the rotating blades. The grass may be cut easier by the rotating blades after being lifted up by the airflow. The housing H2 and the housing H3 may or may not be included according to requirements.

Figure 7B:
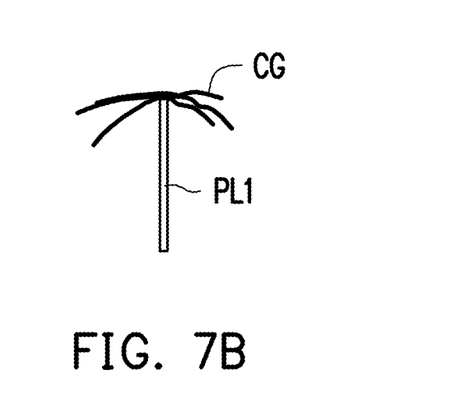
FIG. 7B is a schematic diagram illustrating cut grass being caught on a guide plate.

FIG. 7B is a schematic diagram illustrating cut grass being caught on a guide plate. FIG. 7B illustrates the guide plate PL1 viewed from the bottom of the grass cutting unit 10. Referring to FIG. 7B, cut grass CG may be caught on the front end of the guide plate PL1. The cut grass CG that is caught on the guide plate PL1 may accumulate and fall off resulting in a clumped grass on the mowed lawn.

Figure 8A:
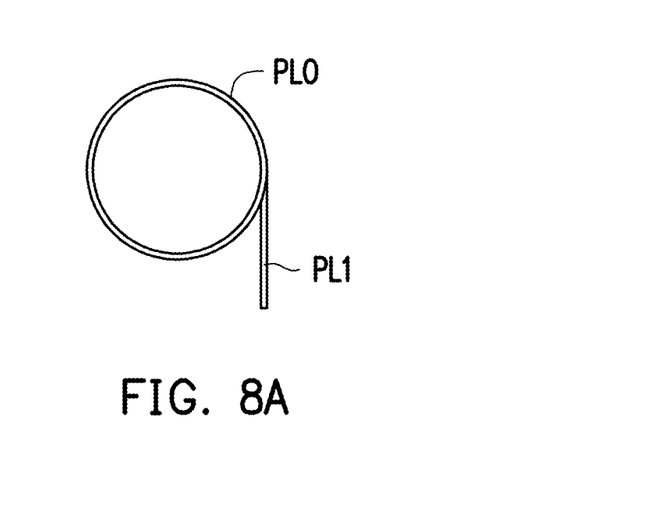
FIG. 8A illustrates a guide plate having a curved part according to another embodiment of the disclosure.

FIG. 8A illustrates a guide plate having a curved part according to an embodiment of the disclosure. Referring to FIG. 8A, in another embodiment of the disclosure, the guide plate PL1 may have a curved part PLO disposed at a front portion of the guide plate. In the present embodiment, the curved part PLO extends from the front end of the guide plate PL1. However, the disclosure is not limited thereto. The curved part PLO may prevent the cut grass CG from becoming caught on the front end of the guide plate PL1 and falling as clumped grass. In addition, the curved part PLO may increase a rigidity of the guide plate PL1. In another embodiment of the disclosure, a gap (space) may be formed between the curved part PLO and the front end of the guide plate PL1.

Referring to FIG. 8A, in the present embodiment, the curved part PLO is a circular part concentric with the rotation center of the second blade BL2. In this way, the curved part PLO may prevent the cut grass CG from becoming caught on the front end of the guide plate PL1 without disturbing an air flow generated by the rotation of the blade. In the present embodiment, the guide plate PL1 is disposed to be tangent to the circular part. In the present embodiment, the circular part PLO is formed by surrounding the entire periphery of the second shaft SFT2. However, the disclosure is not limited thereto. In another embodiment, the curved part PLO may not surround the entire periphery of the second shaft SFT2. For example, the curved part PLO may surround a portion of the periphery of the second shaft SFT2. Furthermore, there may be a plurality of parts (curved parts and/or not curved parts (substantially straight parts)) to surround a portion or an entirety of the second shaft SFT2.

Figure 8B:
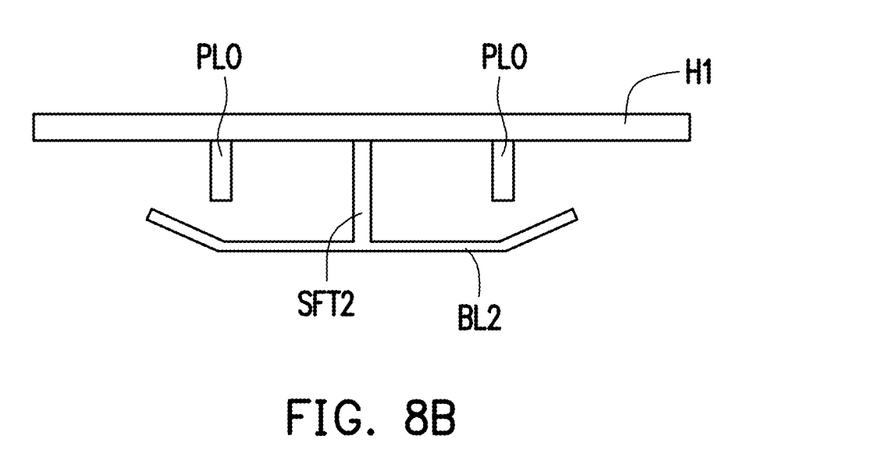
FIG. 8B is a schematic diagram illustrating a side view of the curved part of FIG. 8A.

FIG. 8B is a schematic diagram illustrating a side view of the curved part of FIG. 8A. More specifically, the side view is a view of the guide plate when viewed in the lateral direction of the lawn mower 100. The housing H2 and the housing H3 are omitted from FIG. 8B. The circular part PLO is located closer to a rotation center of the second blade BL2 compared to a cutting portion of the second blade used for cutting. That is to say, the circular part PLO is disposed closer to the second shaft SFT2 compared to the tip of the second blade BL2 used for cutting. In other words, a distance between the second shaft SFT2 and the circular part PLO is smaller than a distance between the second shaft SFT2 and the tip of the second blade BL2. In this way, the circular part PLO is provided at a location that does not interfere with the cutting of grass (such as pressing down the grass to be cut).

Referring to FIG. 8B, the circular part PLO may be directly or indirectly attached to a housing of the grass cutting unit 10. The circular plate PLO may be fixed to the housing of the grass cutting unit 10, for example, by a fastener, adhesive, welding and/or the like. In another embodiment, the circular plate PLO may be fixed to the guide plate PL1. In another embodiment, the circular plate PLO may be integrally formed with the guide plate PL1.

Figure 9:
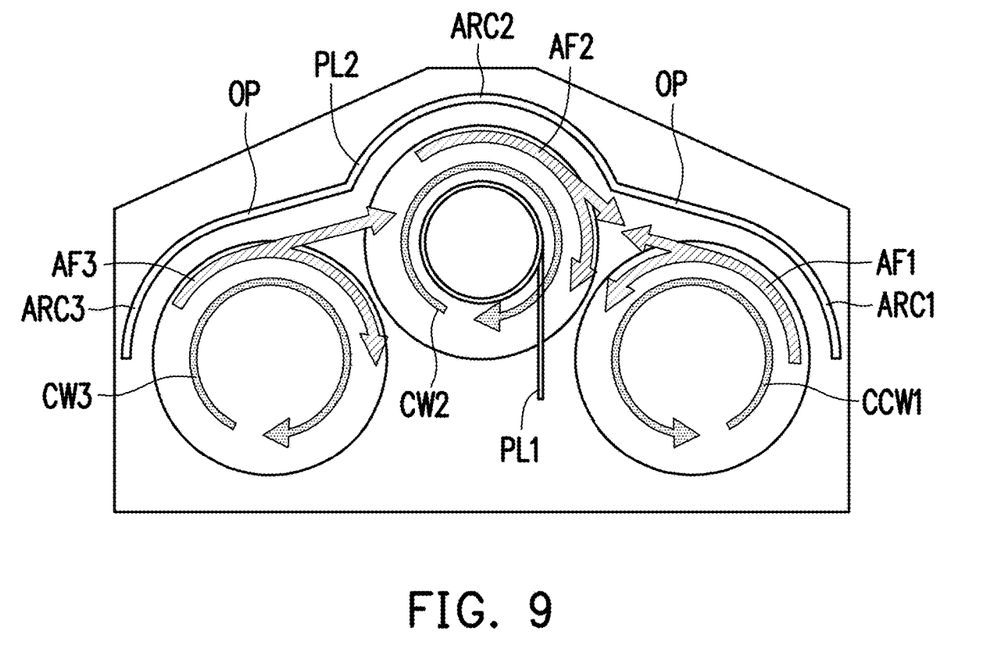
FIG. 9 is a schematic diagram illustrating a second guide plate according to an embodiment of the disclosure.

FIG. 9 is a schematic diagram illustrating a second guide plate according to an embodiment of the disclosure. In an embodiment of the disclosure, the grass cutting unit 10 may further include a second guide plate PL2 disposed on the housing H1 of the grass cutting unit 10. More specifically, the second guide plate PL2 is disposed forward of the first blade BL1 and the second blade BL2 in the front-rear direction of lawn mower 100. The second guide plate PL2 is disposed around the rotation perimeter of the first blade BL1 and the rotation perimeter of the second blade BL2. The second guide plate BL2 includes a first arc part ARC1 around the first blade BL1, a second arc part ARC2 around the second blade BL2, and an orientation part OP oriented from the first arc part ARC1 towards the rotation perimeter of the second blade.

Referring to FIG. 9, the first arc part ARC1 is a curved shape, and the second arc part ARC2 is a curved shape. The orientation part OP is disposed between the first arc part ARC1 and the second arc part ARC2. The orientation part OP connects the first arc part ARC1 and the second arc part ARC2. The orientation part OP has a substantially straight shape. By including the substantially straight orientation part OP, an air flow AF1 generated by the first blade BL1 may split into a plurality of directions. Furthermore, by including the substantially straight orientation part OP, an air flow AF2 generated by the second blade BL2 may split into a plurality of directions. By splitting the air flow AF1 and the air flow AF2 due to the effect of the orientation part OP, the air flow AF1 in the first direction D1 and the airflow AF2 in the second direction D2 (see FIG. 4) may be reduced. Furthermore, the orientation part OP may also prevent the cut grass from being discharged from the front side of the lawn mower 100 by blocking the cut grass from being discharged from the front side of the lawn mower 100.

Figure 10:
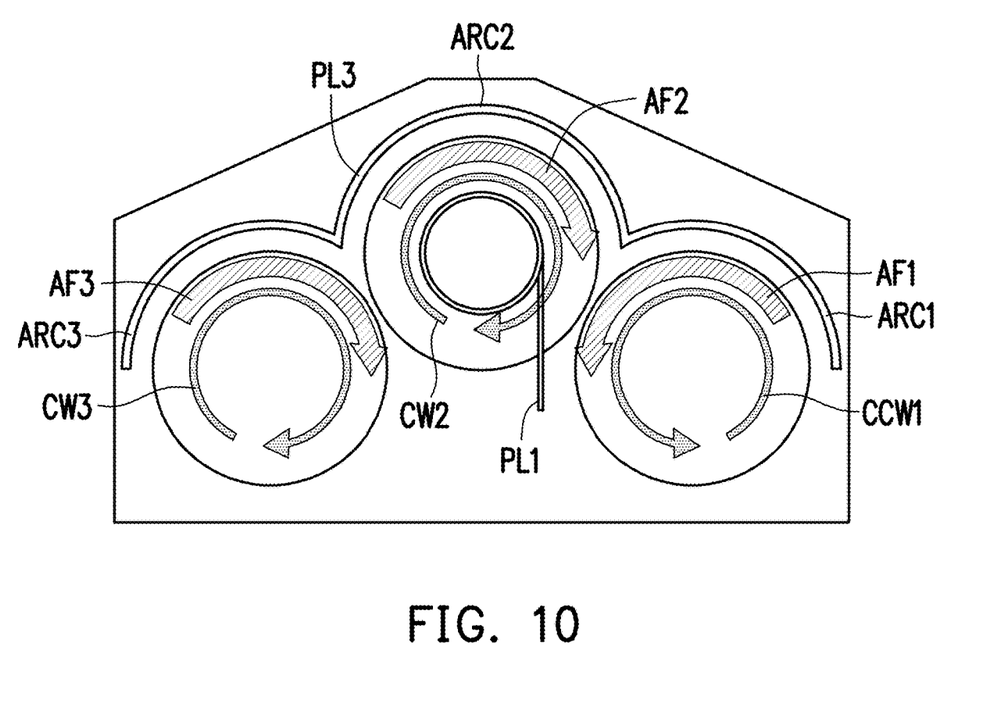
FIG. 10 is a schematic diagram illustrating a third guide plate according to a comparative example.

FIG. 10 is a schematic diagram illustrating a third guide plate according to a comparative example. Referring to FIG. 10, a difference between the configuration of FIG. 9 and FIG. 10 is that the orientation part OP is omitted from the third guide plate PL3 in the configuration of FIG. 10. As shown in FIG. 10, the first arc part ARC1 is directly connected to the second arc part ARC2 without a substantially straight portion (without the orientation part OP). When the orientation part OP is omitted, the air flow AF1 may not split into a plurality of directions and the air flow AF2 may not split into a plurality of directions. Since the air flow AF1 and the air flow AF2 may not split into a plurality of directions, the air flow AF1 in the first direction D1 and the airflow AF2 in the second direction D2 (see FIG. 4) is increased compared to the configuration of FIG. 9 having the orientation part OP.

Figure 11:
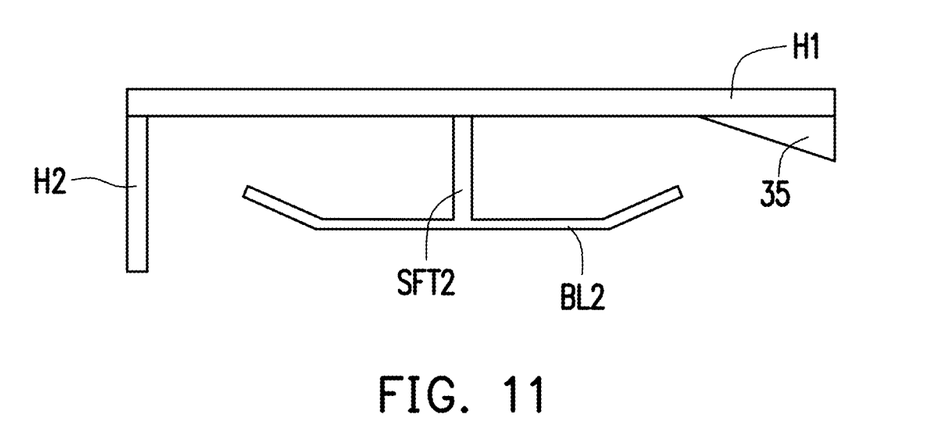
FIG. 11 is a schematic diagram illustrating a side view of an inclined plate according to an embodiment of the disclosure.

FIG. 11 is a schematic diagram illustrating a side view of an inclined plate according to an embodiment of the disclosure. More specifically, the side view is a view of the inclined plate when viewed in the lateral direction of the lawn mower 100 (It should be noted, the guide plate PL1 and the curved part PL0 are omitted in FIG. 11). Referring to FIG. 11, an inclined plate 35 is disposed on the housing H1 of the grass cutting unit 10. The inclined plate 35 may be directly or indirectly attached to the housing H1 of the grass cutting unit 10. The inclined plate 35 may be fixed to the housing H1 of the grass cutting unit 10, for example, by a fastener, adhesive, welding and/or the like.

Referring to FIG. 11, the inclined plate 35 is disposed at the rear of the first blade BL1 and the second blade BL2 in the front-rear direction of lawn mower 100. A distance between an inclined surface of the inclined plate 35 and the housing H1 gradually changes in the front-rear direction of the lawn mower 100. A distance between the inclined surface of the inclined plate and the housing H1 at the rear of the lawn mower 100 is greater than a distance between the inclined surface of the inclined plate 35 and the housing H1 at the front of the lawn mower 100. The inclined plate 35 assists the discharge of the cut grass towards the rear bottom of the lawn mower 100. Discharging cut grass towards the rear is referred to as "rear discharge". In comparison, discharging cut grass towards the side (the lateral direction) is refereed to as "side discharge". The inclined plate 35 is mainly used in rear discharge lawn mowers 100.

Although embodiments of the lawn mower and the guide plates according to the disclosure have been described above based on some examples, the disclosure is not limited thereto.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A lawn mower comprising:
a first blade having a first tip; and
a second blade having a second tip,
wherein the first blade and the second blade are disposed adjacent to each other, and a rotation direction of the first blade is different from a rotation direction of the second blade,
wherein, in a lateral direction that is substantially perpendicular to a front-rear direction of the lawn mower, a guide plate is disposed between a rotation center of the first blade and a rotation center of the second blade, and the guide plate is disposed above the second blade, and the guide plate extends toward a rear of the lawn mower in the front-rear direction of the lawn mower,
wherein the rotation center of the first blade is disposed at a location rear of the rotation center of the second blade in the front-rear direction of the lawn mower, and the guide plate is disposed closer to the rotation center of the second blade relative to the rotation center of the first blade,
wherein in the front-rear direction of the lawn mower, the first blade and the second blade both extend further rearward than the guide plate.

2. The lawn mower according to claim 1, wherein a first line is represented by an imaginary line passing through the rotation center of the first blade and the rotation center of the second blade, a front end of the guide plate is located forward of the first line in a front-rear direction of the lawn mower.

3. The lawn mower according to claim 2, wherein
a second line is represented by an imaginary line that is perpendicular to the first line, and the second line is located between a rotation perimeter of the first blade and a rotation perimeter of the second blade, and
a third line is represented by an imaginary line that is an extension of the guide plate,
the third line and the second line cross each other at an acute angle at a location rear of the first line in the front-rear direction of the lawn mower.

4. The lawn mower according to claim 3, wherein the front end of the guide plate is disposed closer to the rotation center of the second blade relative to the rotation center of the first blade.

5. The lawn mower according to claim 1, wherein the guide plate has a curved part at a front portion of the guide plate.

6. The lawn mower according to claim 2, wherein the guide plate has a curved part at a front portion of the guide plate.

7. The lawn mower according to claim 3, wherein the guide plate has a curved part at a front portion of the guide plate.

8. The lawn mower according to claim 4, wherein the guide plate has a curved part at a front portion of the guide plate.

9. The lawn mower according to claim 5, wherein the curved part is a circular part concentric with the rotation center of the second blade.

10. The lawn mower according to claim 6, wherein the curved part is a circular part concentric with the rotation center of the second blade.

11. The lawn mower according to claim 7, wherein the curved part is a circular part concentric with the rotation center of the second blade.

12. The lawn mower according to claim 8, wherein the curved part is a circular part concentric with the rotation center of the second blade.

13. The lawn mower according to claim 9, wherein the circular part is located closer to the rotation center of the second blade compared to a cutting portion of the second blade used for cutting.

14. The lawn mower according to claim 10, wherein the circular part is located closer to the rotation center of the second blade compared to a cutting portion of the second blade used for cutting.

15. The lawn mower according to claim 11, wherein the circular part is located closer to the rotation center of the second blade compared to a cutting portion of the second blade used for cutting.

16. The lawn mower according to claim 12, wherein the circular part is located closer to the rotation center of the second blade compared to a cutting portion of the second blade used for cutting.

17. The lawn mower according to claim 4, further comprising:
  a front guide disposed around the rotation perimeter of the first blade and the rotation perimeter of the second blade, the front guide comprising:
    a first arc part around the first blade;
    a second arc part around the second blade;
    an orientation part oriented from the first arc part towards the rotation perimeter of the second blade.

18. The lawn mower according to claim 8, further comprising:
  a front guide disposed around the rotation perimeter of the first blade and the rotation perimeter of the second blade, the front guide comprising:
    a first arc part around the first blade;
    a second arc part around the second blade;
    an orientation part oriented from the first arc part towards the rotation perimeter of the second blade.

19. The lawn mower according to claim 12, further comprising:
  a front guide disposed around the rotation perimeter of the first blade and the rotation perimeter of the second blade, the front guide comprising:
    a first arc part around the first blade;
    a second arc part around the second blade;
    an orientation part oriented from the first arc part towards the rotation perimeter of the second blade.

20. The lawn mower according to claim 16, further comprising:
  a front guide disposed around the rotation perimeter of the first blade and the rotation perimeter of the second blade, the front guide comprising:
    a first arc part around the first blade;
    a second arc part around the second blade;
    an orientation part oriented from the first arc part towards the rotation perimeter of the second blade.

* * * * *